MAILING ENVELOPES

Original Filed Jan. 28, 1964

INVENTOR

FRANK X. MUDD, JR.

BY Robert M. Dunning

ATTORNEY

INVENTOR
FRANK X. MUDD, JR.
BY Robert M. Dunning
ATTORNEY

United States Patent Office

Re. 26,532
Reissued Mar. 4, 1969

26,532
MAILING ENVELOPES

Frank X. Mudd, Jr., Palatine, Ill., assignor to Curtis 1000, Inc., Ramsey, Minn., a corporation of Minnesota Original No. 3,237,970, dated Mar. 1, 1966, Ser. No. 340,602, Jan. 28, 1964. Application for reissue May 19, 1967, Ser. No. 652,379

Matter enclosed in heavy brackets [ ] appears in the original patent but forms no part of this reissue specification; matter printed in italics indicates the additions made by reissue.

U.S. Cl. 282—25 8 Claims
Int. Cl. B41l *1/20*

*ABSTRACT OF THE DISCLOSURE*

*The invention relates to a structure in which an original copy form is detachably secured overlying the window panel of a window envelope. A duplicate copy form of material capable of producing visible indicia when subjected to pressure is enclosed in the envelope. The original copy form is written upon, the writing being duplicated on the duplicate copy form with the duplicate writing being visible through the window of the envelope.*

This invention relates to an improvement in mailing envelopes and deals particularly with a structure in which an original form is secured overlying the outer surface of an envelope, a duplicate copy form is enclosed within the envelope and in which the outer original form may be detached from the envelope and duplicate inner form after the forms have been filled out by typing or other such means.

During recent years, the use of duplicate forms has greatly increased. For example, an employer is required to prepare a duplicate form for each employee stating the amount paid to the employee during each calendar year. The original of this form is supplied to the government, and the duplicate form is submitted by the employee at the time of filing his income tax report. Financial institutions paying interest on savings or on securities held in the name of a customer are required to provide a duplicate form showing the amount of interest paid during each calendar year, the original of which is supplied to the government and the duplicate copy of which is sent to the customer for filing with the income tax return. These duplicate forms are usually separately typed out, the original and duplicate are separated, and the duplicate copy is enclosed and sealed in an envelope addressed to the payee.

Papers have now been produced which permit duplicate copies to be made without the use of carbon paper in its ordinary form. This paper, when placed beneath an original, will provide a duplicate copy by pressure upon the surface of the paper. As a result, information typed upon the original of the form will also appear on the duplicate copy. Similarly, names and addresses which are printed upon the original by an addressing machine will also appear on the copy. An object of the present invention lies in the utilization of paper of this type in simplifying the preparation of duplicate forms for mailing.

It has been found that envelopes may be automatically produced which enclose the duplicate copy of a form, and the original of the form may be automatically attached to overlie the front surface of the envelope. The original form may be filled in in the usual manner either by typing the information on the form or applying the information through the use of a bookkeeping machine, and addressing machine, or any similar apparatus capable of filling out the necessary information on the original. As the original is printed, the same information is duplicated on the form sealed within the envelope. By providing a window in the envelope through which a selected area of the duplicate form may be seen, the form is complete for mailing as soon as the original is detached from the face of the envelope.

A feature of the present invention resides in the provision of an envelope having front and rear panels, and having extension flaps on one of the panels usually extending beyond opposite side edges of the other panel. These extension flaps are detachably secured to the remainder of the envelope by suitable means such as lines of perforation. The original of the duplicate form preferably extends across the face of the envelope and is also provided with extension flanges adhered or otherwise secured to the extension flaps of the envelope. The extension flanges are also detachably connected to the body of the duplicate form original by weakened lines of separation generally coinciding with those connecting the extension flaps to the envelope. After each form has been filled out, the combined flaps and flanges at opposite sides of the envelope are detached, leaving the duplicate copy of the form enclosed within the envelope and the original detached for retention by the sender.

A further feature of the present invention resides in the provision of a mailing envelope of the type described which may be secured in a continuous series on a backing sheet preferably having laterally projecting perforated edges for use in conjunction with a pin wheel feeding mechanism or other device, or may be secured in series between a pair of perforated tapes which serve the same purpose as the backing sheet. With this arrangement, the envelopes may be fed sequentially to an addressing machine or a bookkeeping machine of suitable type. When so arranged, the original of the form may be detached from the envelope at the same time the envelope is detached from the backing sheet or feed tapes.

In the following description and claims, a single sheet forming an original and a single form contained in the envelope has been described. It is realized, however, that in some instances more copies of the information are required. Thus it should be understood that instead of a single sheet overlying the face of the envelope, a plurality of superimposed sheets may be provided, the sheets being imprinted with the information applied to the original by any suitable means. Furthermore, the envelope may contain duplicate copies rather than a single copy as has been described, these copies underlying the copy described.

These and other objects and novel features of the present invention will be more clearly and fully set forth in the following specification and claims.

Figure 4:
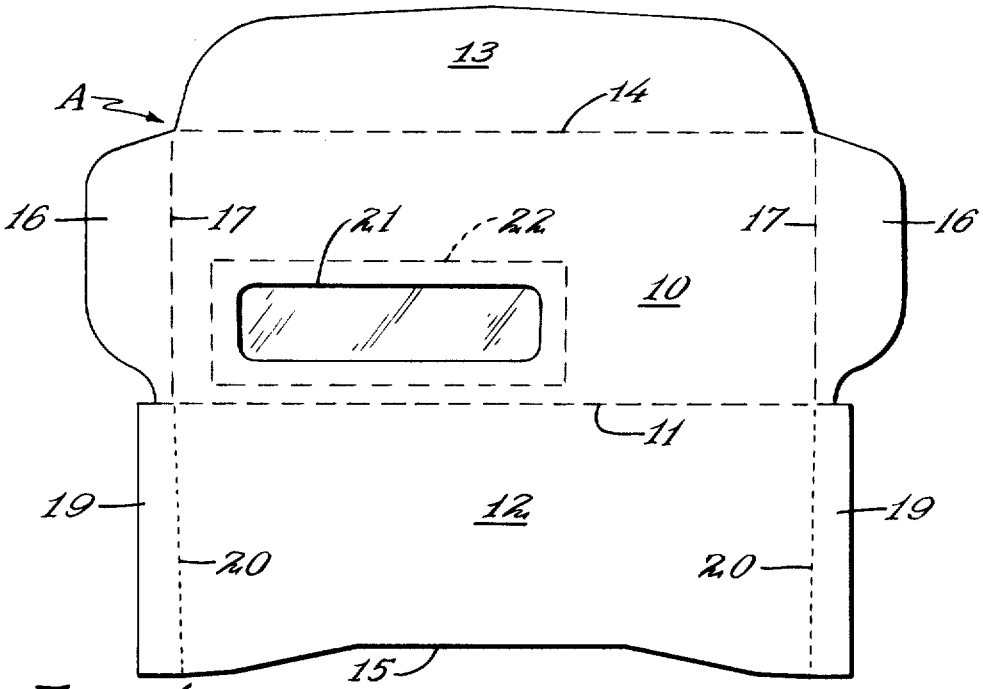
FIGURE 4 is a diagrammatic view of the envelope blank showing a typical form of construction.

As indicated in FIGURE 4 of the drawings, the envelope A includes a generally rectangular front panel 10 which is hingedly connected along a fold line 11 to the rear panel 12. A sealing flap 13 is hingedly connected to the edge of the front panel 10 opposite the hinge line 11 along a line of fold 14. The specific shape of the structure may obviously be varied. The rear panel 12 is shown with a central notch 15 along its free edge to simplify the removal of the envelope contents.

Sealing flaps 16 are hingedly secured to opposite ends of the front panel 10 along parallel fold lines 17. Extension flaps 19 are detachably connected to the ends of the rear panel 12 along generally parallel perforated lines 20. The perforated lines 20 may be slightly inwardly offset from the fold line 17 so that the rear panel will not project laterally beyond the front panel after the extension flaps 19 have been removed. It should be understood that while the sealing flaps 16 have been described as being secured to the front panel, and the extension flaps 19 have been described as detachably connected to the rear panel, the position of the flaps may be reversed if desired.

In the preferred form of construction, a generally rectangular window opening 21 is provided at a suitable location in the front panel 10, and the opening 21 is normally closed by a transparent sheet 22 adhered marginally to the inner surface of the front panel.

The duplicate form comprises two separate sheets illustrated in general by the letters B and C respectively. The duplicate copy B comprises the rectangular sheet 23 of paper which provides a visible copy when subjected to pressure. Papers of this type are commercially available and eliminate the necessity of employing carbon paper in its usual form between the original and duplicate copy and eliminate the necessity of coating the reverse side of the overlying sheet with a film of carbon.

The original C of the duplicate form includes a central body portion 24 which may be generally similar in size to the front panel 10 of the envelope or which at least is generally co-extensive in width. The body portion 24 is connected along perforated lines 25 to extension flanges 26 which are preferably substantially equal in width to the extention flaps 19.

In the formation of the envelope A, the sealing flaps 16 are folded along their fold line 17 to overlie the surface of the panel to which they are attached, which in the construction illustrated comprises the front panel 10. Adhesive is applied to the exposed surface of the sealing flaps 16, and the rear panel 12 is folded to overlie the sealing flaps 16 and is adhered thereto. Obviously, if the sealing flaps 16 are hinged to the rear panel 12, the application of adhesive to the flaps 16 will adhere these flaps to the front panel 10. In the arrangement illustrated, this procedure leaves the projecting flanges 19 or extension flaps to project laterally beyond the remainder of the envelope.

Figure 5:
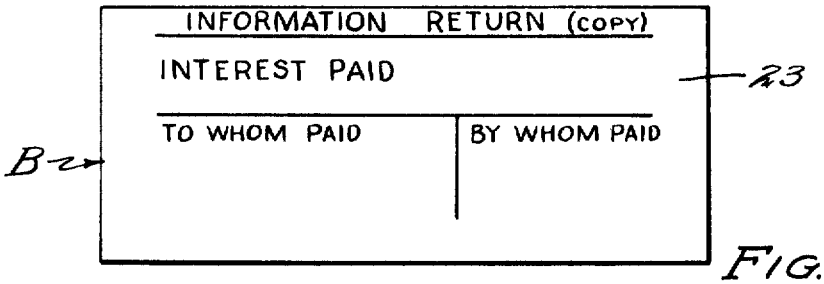
FIGURE 5 is a plan view of a typical duplicate copy enclosed within the envelope.
Figure 6:
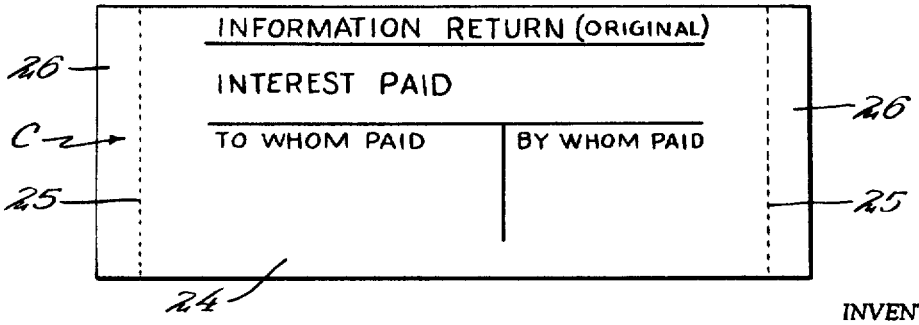
FIGURE 6 is a plan view of the original of the duplicate form for the purpose of illustration.

At some time during the formation of the envelope A, the duplicate copy B is positioned within the envelope A between the front and rear panels 10 and 12. Under usual circumstances, the sealing flap 13 is then secured in overlapping relation with the back panel 12 so that the duplicate copy B illustrated in FIGURE 5 of the drawings is sealed within the envelope A.

Also at some time during the procedure, the original C of the duplicate form is positioned in substantially contiguous relation with the front panel 10 of the envelope, and the extension flanges 26 are adhered in face contact with the extension flaps of the rear panel 12. When in this position, the original C of the duplicate form overlies the front envelope panel 10. Indicia such as 29 is then typed or printed on the original C of the duplicate form in the area of the form overlying the window 21. The pressure of the key striking the form original C causes similar indicia 30 to appear on the duplicate sheet 23 of the duplicate copy B which is located within the envelope. In a similar manner, other material which is concealed within the envelope may be printed upon the duplicate [C]*B* by typing or imprinting the original C. Other means of applying the information may be used such as the printing means found on addressing machines, bookkeeping machines and the like.

Information printed upon the portion of the duplicate copy B is sent through the mail in the sealed envelope, while the original is detached and retained by the sender.

Figure 1:
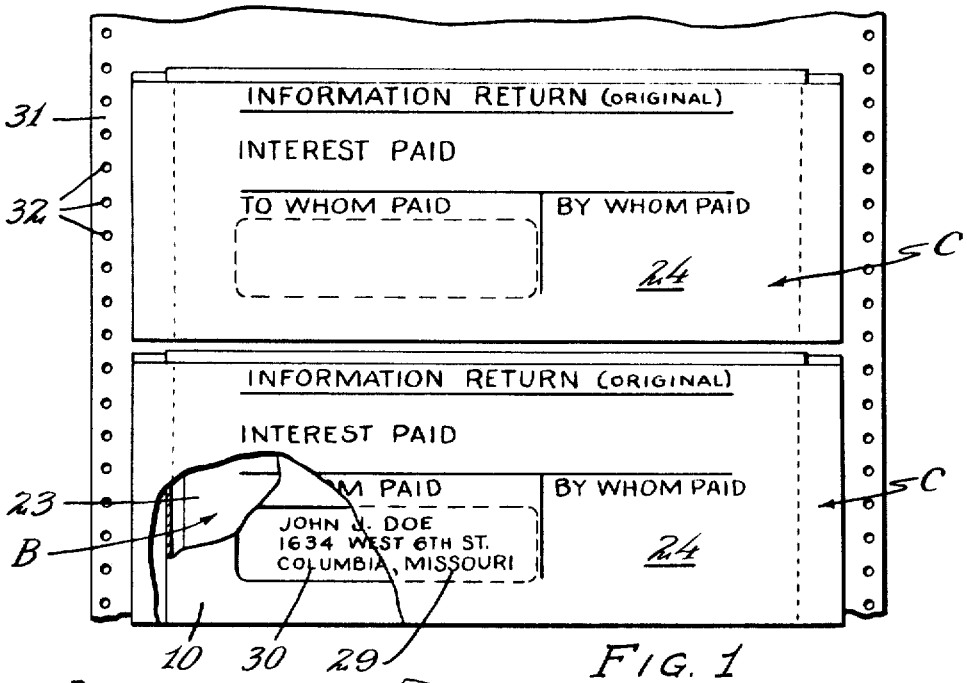
FIGURE 1 is a plan view of a series of envelopes attached to a backing sheet, portions of the structure being removed or broken away to disclose the construction thereof.
Figure 3:
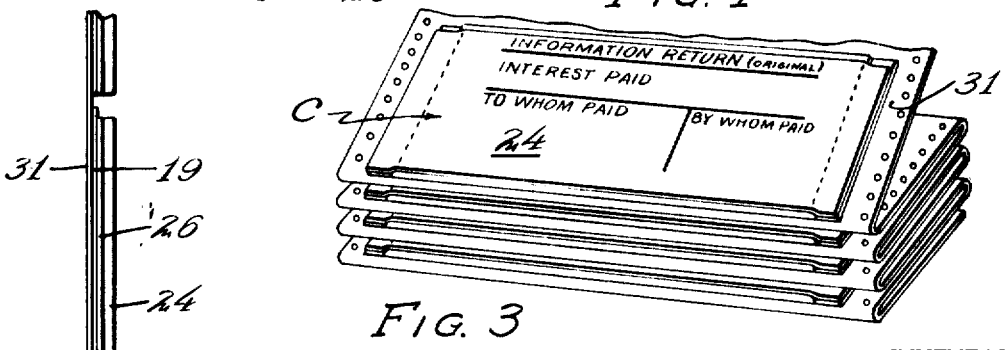
FIGURE 3 is a perspective view of a continuous series of envelopes folded in zigzag form.
Figure 2:
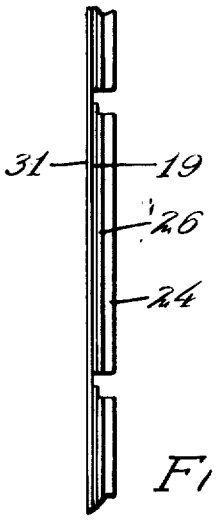
FIGURE 2 is a side elevational view of the construction illustrated in FIGURE 1.

FIGURES 1, 2, and 3 of the drawings show the envelopes A mounted upon an elongated backing sheet or web for delivery to an addressing machine or bookkeeping machine. As indicated in this view, the backing web 31 is provided with spaced perforations 32 extending longitudinally of the web and adjacent the side edges thereof for engagement by the pinwheels or sprockets of the apparatus. The envelopes may be placed upon the backing sheet 31 in a manner somewhat similar to that illustrated in Patent 2,723,077 issued November 8, 1955 to H. M. Whitman except for the fact that in the present case the envelopes are preferably sealed. Alternatively, the envelopes may be secured between a pair of tapes such as shown in Patent 2,723,076 also issued November 8, 1955 to H. M. Whitman. However, in both of the present structures, the original C is detached simultaneously with the separation of the envelope from the backing sheet or tapes so that the original C may be filed with similar statements and the envelopes A including the duplicate copy B may be mailed.

Figure 7:
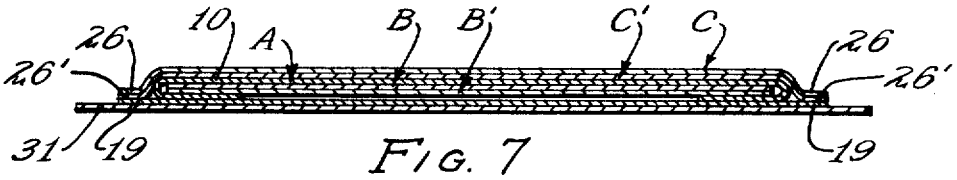
FIGURE 7 is a sectional view through an end of a form disclosing a modified form of construction.

FIGURE 7 shows a slightly different modification of the structure in which additional forms are provided. It should be understood that in some instances a plurality of forms are required in place of the single original form 24 and single envelope enclosed duplicate copy 23 are required. As indicated in FIGURE 7 of the drawings, a detachable copy of the original C may underlie the original copy C and be sandwiched between the original form C and the front panel 10 of the envelope A. In the arrangement shown in FIGURE 7, the detachable copy C is identical to the original C and is provided with laterally extending flaps 26′ which connect the flaps 26 of the original to the flaps 19 of the envelope A. However, any means may be provided for holding the detachable copy C′ in proper position.

In this case, the indicia may be applied to the detachable copy C′ by any suitable means. The original C may have a carbon coated back, or carbon paper may be interleaved between the copies C and C′. Alternatively, the copy C′ may be of any suitable material which will disclose impressions when subjected to pressure.

It is also possible to add additional copies of the enclosed form. FIGURE 7 shows a second duplicate copy B′ beneath the copy B and adapted to receive the information typed or otherwise impressed upon the copy B. This may be done by any suitable duplicating means, as has been disclosed. A carbon coating, carbon paper, or any copy paper capable of producing a visible copy when subjected to pressure may be used.

In accordance with the patent statutes, the principles of construction and operation of this improvement in mailing envelopes have been described, and while an endeavor has been made to set forth the best embodiment thereof, it should be understood that changes may be made within the scope of the following claims without departing from the spirit of the invention.

I claim:

1. In combination, an envelope including an envelope body having front and rear panels, flaps forming extensions from opposite ends of one of said panels of said envelope body, weakened lines of separation between said one panel and said extensions, a duplicate form original overlying said envelope body and generally coextensive therewith, flanges on opposite ends of said form original overlying said flaps and secured in face contact therewith, weakened lines of separation substantially coinciding with said first weakened lines of separation, and a duplicate form duplicate of sheet material capable of producing visible indicia on said duplicate when discrete areas thereof are subjected to pressure such as by that produced by a typewriter key or printing plate, *said duplicate form duplicate being enclosed between said panels,* the panel of said envelope between said duplicate form original and said duplicate form duplicate includes a window through which a portion of the duplicate may be viewed when said flaps and flanges are detached from said envelope body and original, respectively.

2. The structure of claim 1 and including connecting means secured in face contact with a series of envelopes and detachable therefrom.

3. In combination, an envelope including an envelope body having front and rear panels, the front panel including a window, a pair of sealing flaps on one of said panels secured in face contact with portions of the other panel to hold said panels connected, a pair of flap extensions on the other of said panels projecting from opposite sides thereof, weakened lines of separation between said flap extensions and said other [flap] *panel,* a duplicate form including an original sheet and a duplicate sheet, said duplicate sheet being of a material capable of displaying indicia when discrete areas thereof are subjected to pressure as by typewriter keys or a printing plate acting upon the original sheet when the sheets are superposed, said original sheet including extension flanges secured in face contact with said extension flaps, said original sheet overlying said front panel of said envelope body, weakened lines of separation between said original sheet and said extension flanges, and said duplicate sheet being enclosed between said panels and a portion thereof being visible through said window.

4. The structure of claim 3 and including a sealing flap secured to one edge of said panel and secured to the other panel to form an envelope closure.

5. In combination an envelope including a generally rectangular front panel and a rear panel foldably connected along an edge, said front panel having a window opening therein, sealing flaps hinged to the edges of one panel adjoining said one edge, and secured in face contact with corresponding edge portions of the other panel, flap extensions secured to said adjoining edges of said other panel, weakened lines of separation between said flap extensions and said other panel, a sealing flap on the remaining edge of one of said panels adapted to be secured to the other said panel to seal the envelope, a duplicate form including an original sheet and a duplicate sheet, said duplicate sheet being sandwiched between said panels and being of a material capable of producing visible indicia on discrete areas thereof when subjected to pressure in these areas, said original sheet overlying a major portion of said front panel including said window opening, extension flanges on said original sheet and secured in face contact with said flap extensions, and weakened lines of separation between said original sheet and said extension flanges, whereby said extension flanges and flap extensions may be simultaneously detached from said other panel and said original sheet.

6. The structure of claim 5 and including means supporting a series of similar envelopes in spaced parallel relation.

7. The structure of claim 1 and including means connecting a series of envelopes and detachable therefrom.

*8. In combination, an envelope including an envelope body having front and rear panels,*

*a flap forming an extension from at least one end of one of said panels of said envelope body,*

*a weakened line of separation between said one panel and said extension,*

*a duplicate form original overlying said envelope body and generally coextensive therewith, a flange on one end of said form original overlying said flap and secured, in face contact therewith,*

*a weakened line of separation substantially coinciding with said first weakened line of separation, and*

*a duplicate form duplicate of sheet material capable of producing visible indicia on said duplicate when discrete areas thereof are subjected to pressure such as by that produced by a typewriter key or printing plate, said duplicate form duplicate being enclosed between said panels,*

*the panel of said envelope between said duplicate form original and said duplicate form duplicate includes a window through which a portion of the duplicate may be viewed when said flaps and flange are detached from said envelope body and original, respectively.*

References Cited

The following references, cited by the Examiner, are of record in the patented file of this patent or the original patent.

UNITED STATES PATENTS

| | | | |
|---|---|---|---|
| 1,371,670 | 3/1921 | Dority et al. | 282—25 |
| 2,669,464 | 2/1954 | Lay et al. | 282—25 |
| 2,723,076 | 11/1955 | Whitman | 229—69 |
| 2,723,077 | 11/1955 | Whitman | 229—69 |
| 3,018,033 | 1/1962 | Henry | 229—73 |
| 3,048,426 | 8/1962 | Rodriguez et al. | 282—23 |

JEROME SCHNALL, *Primary Examiner.*

U.S. Cl. X.R.

282—11.5